May 20, 1952 — N. NORDENSTAM — 2,597,366
LAWN SPRINKLER
Filed April 26, 1948 — 3 Sheets-Sheet 1
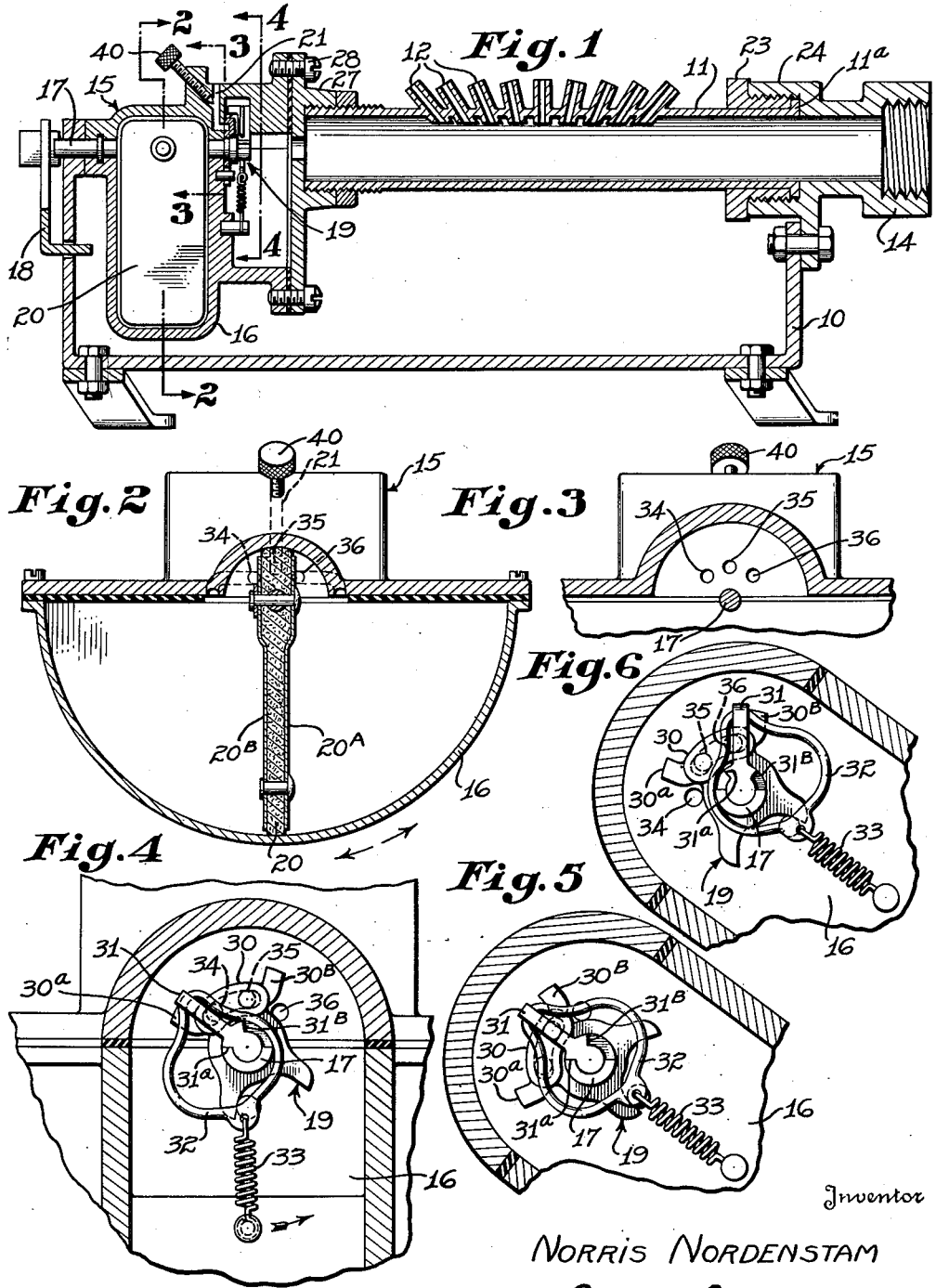
Inventor
NORRIS NORDENSTAM
By Lyon & Lyon
Attorneys

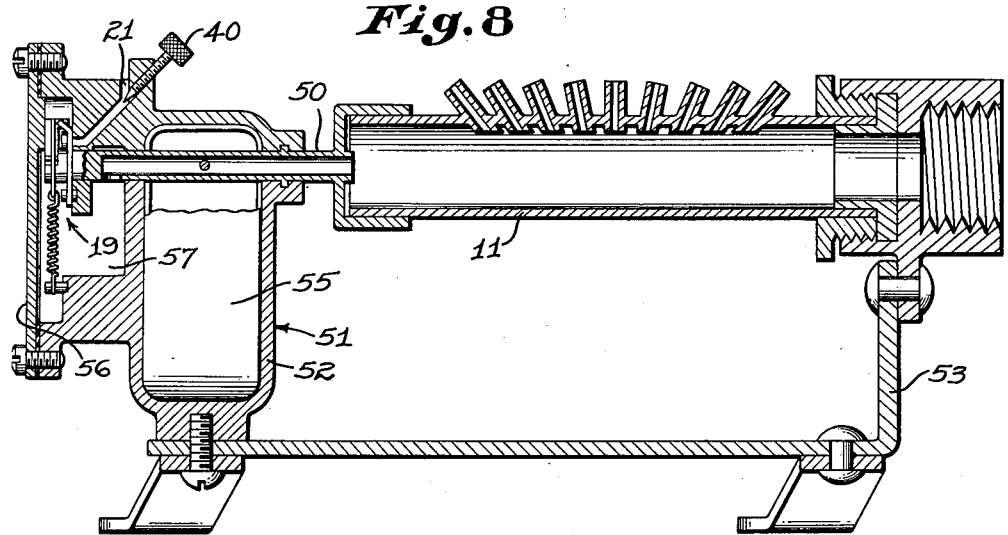
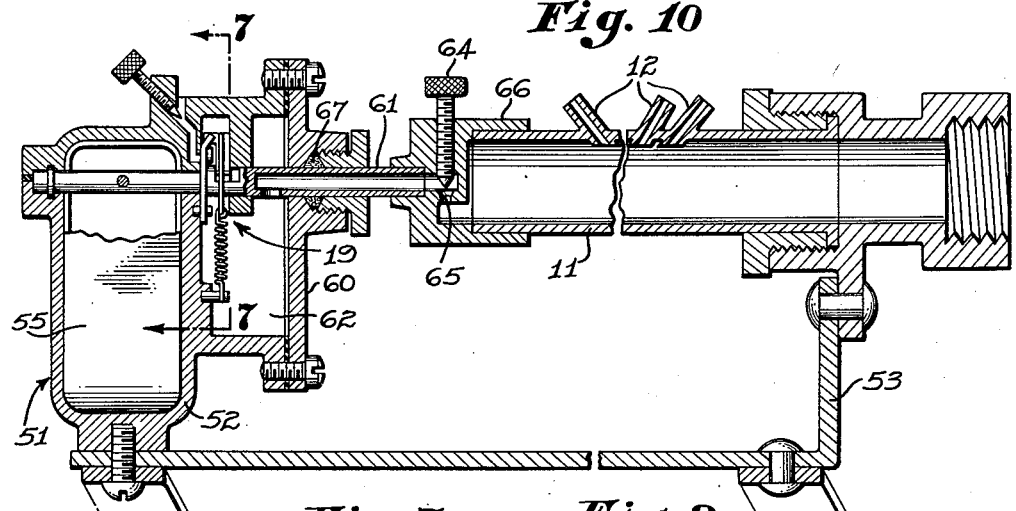
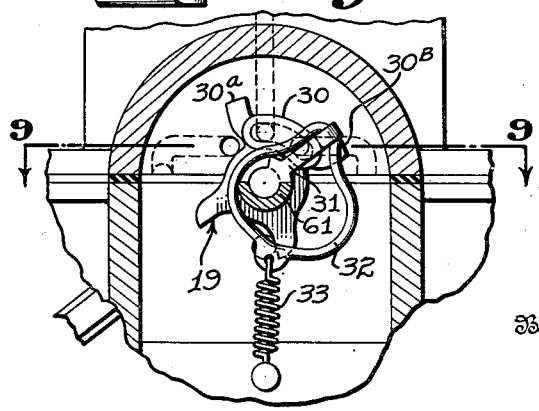
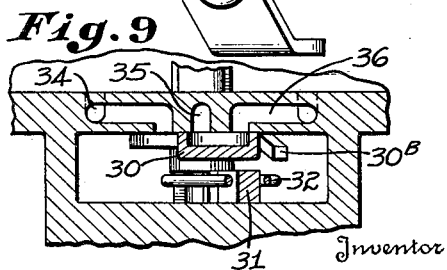

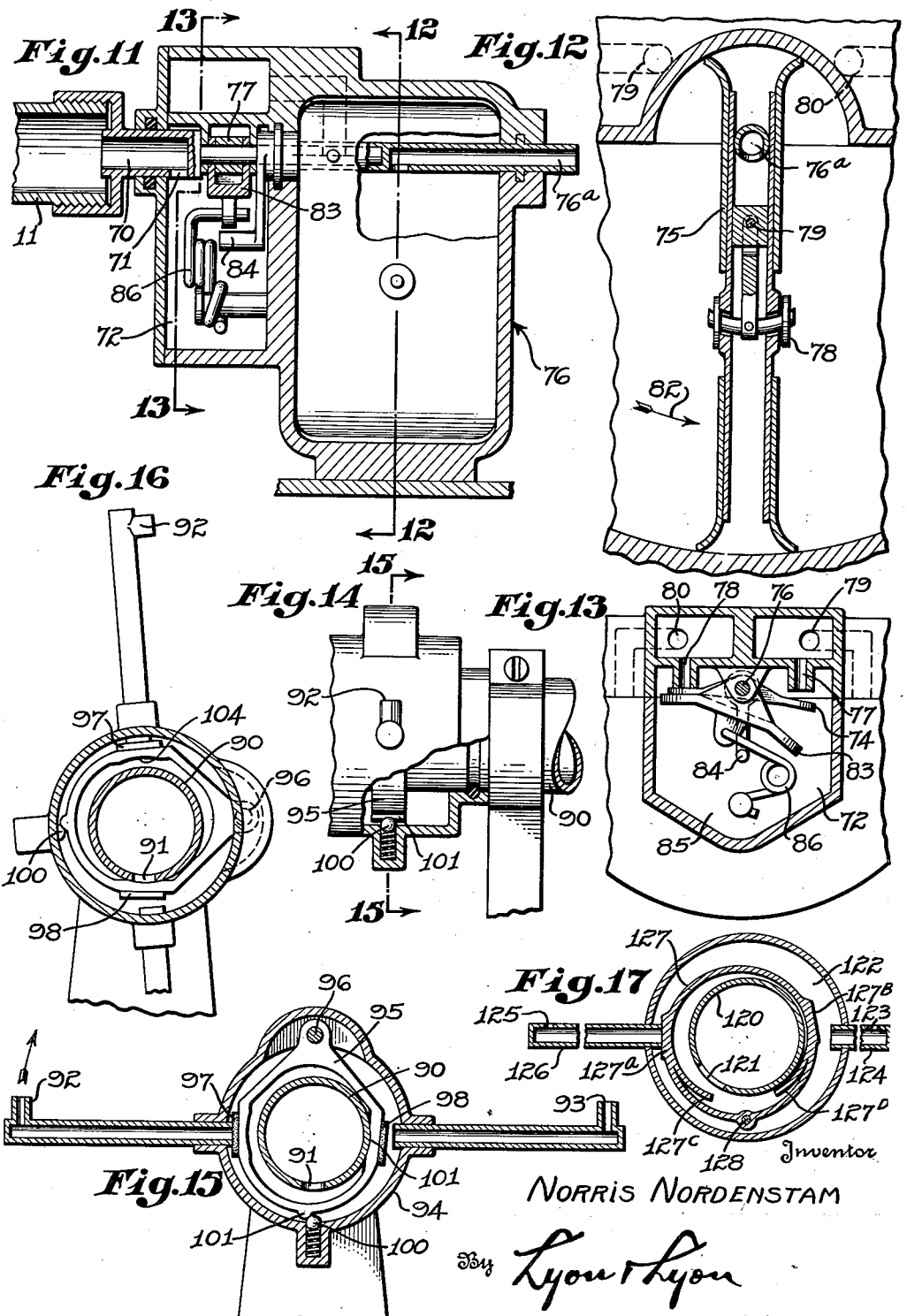

Patented May 20, 1952

2,597,366

UNITED STATES PATENT OFFICE 2,597,366

LAWN SPRINKLER

Norris Nordenstam, Riverside, Calif.

Application April 26, 1948, Serial No. 23,249

3 Claims. (Cl. 299—66)

The present invention relates to an improved sprinkler.

It is desirable that a sprinkler for use in sprinkling lawns be rugged, simple, fool proof, inexpensive and of a minimum number of parts which are not likely to become worn in use.

It is therefore an object of the present invention to provide an improved lawn sprinkler achieving the above mentioned desideratum.

Another object of the present invention is to provide an improved lawn sprinkler which may be easily adjusted to provide different rates at which water is sprinkled on the lawn.

Still another object of the present invention is to provide improved lawn sprinklers comprising a minimum number of parts which may be made and assembled in accordance with present mass production methods.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a longitudinal sectional view through an improved lawn sprinkler embodying the present invention.

Figures 2, 3 and 4 are sectional views taken respectively on the lines 2—2, 3—3 and 4—4 of Figure 1.

Figures 5 and 6 show the mechanism of Figure 4 in different operating positions.

Figure 7 is a sectional view taken substantially on the line 7—7 of Figure 10.

Figure 8 is a sectional view through a modified form of my lawn sprinkler.

Figure 9 is a sectional view taken substantially on the line 9—9 of Figure 7.

Figure 10 is a longitudinal sectional view through another modified lawn sprinkler embodying the present invention.

Figure 11 is a longitudinal sectional view through a portion of still another lawn sprinkler embodying the present invention.

Figures 12 and 13 are sectional views taken substantially on the lines 12—12 and 13—13 of Figure 11.

Figure 14 is a view in side elevation, partly in fragment of a portion of another modified lawn sprinkler structure embodying the present invention.

Figure 15 is a longitudinal sectional view taken substantially on the line 15—15 of Figure 14.

Figure 16 shows the apparatus of Figure 15 in a different operating position.

Figure 17 is a longitudinal sectional view similar to the sectional view shown in Figure 15 through another modification of apparatus embodying the present invention.

Referring to Figures 1 through 6, the lawn sprinkler shown therein includes a stationary base or cradle 10 in which the cylindrical pipe 11 having the ports 12 is supported for oscillatory movement about the axis of pipe 11.

There are preferably a plurality of such ports 12 extending in various directions so that water entering the sprinkler at the inlet 14 may pass through the pipe 11 and out through the ports 12 in the form of a fine spray. The ports 12 comprise small tubes, the axes of which lie in the same plane. The pipe 11 is oscillated as mentioned briefly above by the water motor having the general reference numeral 15. The casing 16 of this water motor is directly connected to the oscillator pipe 11 while the shaft 17 of the motor is normally maintained in locked position with respect to the base 10 by the locking member 18.

This water motor may be a motor of the type normally found in automobiles for oscillating windshield wipers but is modified and adapted in accordance with the present invention for operation by water entering at 14. It is noted that most of the water entering at 14 passes out of the ports 12 while a much smaller amount passes through the full length of the pipe 11 through the automatically operated valve structure 19 to exert a pressure on the locked piston member 20 and casing 16 to produce oscillatory movement of the casing 16 and after the water produces the desired motion of casing 16, it passes out of the outlet port 21. Thus, there are two paths that water entering at the inlet 14 may take. Namely, a path through the ports 12 and a second path through the water motor 15.

The pipe 11 has a flange 11A thereon which is confined by the plug 23 screw threadedly mounted in the coupling unit 24 which is stationarily mounted on the base 10 and which has a screw threaded opening 14 adapted to screw threadedly receive a conventional garden hose. The other end of pipe 11 is screw threaded in the flange member 27 which is affixed by screws 28 to the casing 16 of the fluid motor. The casing 16 is adapted to oscillate automatically as explained in greater detail below with reference to the structure shown in Figures 2, 3, 4, 5 and 6.

The valve structure 19 automatically controls the distribution of water to either the right hand or left hand face 20A, 20B of the locked member 20. Since the member 20 is locked in position and the casing 16 moves in either the clockwise or counterclockwise direction due to reaction forces depending respectively on whether the water is directed to the face 20A or the face 20B.

The valve structure 19 comprises a movable port closure member 30, a member 31 for actuating such port closure member 30, the member 31 being arranged to be moved to either one of the two positions shown in Figures 4 and 6 with a snap action. Such snap action movement is provided by the yoke member 32 which is normally pressed into engagement with the actuating member 31 by the coil tension spring 33 having one of its ends attached to said yoke member 32 and the other one of its ends attached to the casing 16. The actuating member 31 pivots about an axis corresponding to the axis of the shaft 17 and has a pair of shoulders 31A, 31B adapted respectively to engage an extension of the locked shaft 17 to limit movement of the actuating member 31 in its two extreme positions shown in Figures 4 and 6. The valve closure member 30 is rotatably supported on the extension of shaft 17 and has a pair of spaced extensions 30A, 30B thereon in the path of movement of the actuating member 31. This valve closure member 30 slides on a face of the casing 16 through which the ports 34, 35 and 36 extend. One position of the member 30, the ports 34 and 35, are closed while in the other position shown in Figure 6, the ports 35 and 36 are closed. When the port 34 is opened as shown in Figure 6, water is allowed to flow against the face 20A and when, as shown in Figure 4, the port 36 is opened, water is allowed to flow against the face 20B to correspondingly cause movement of the casing 16 in the counterclockwise and clockwise directions respectively.

Port 35 is in communication with the opening 21. In Figure 6 the structure shown therein is identical to the corresponding structure shown in Figure 9 and it is noted that the port 35 is in communication with port 36 when port 34 is opened to allow water flowing into the fluid motor; and, conversely when the port 36 is exposed to allow water to flow to the opposite side of the stationary member 20, port 35 is in communication with port 34. Thus, it is evident that the member 30 serves not only to allow exposure of one of the ports 34, 36 for the entrance of water into the fluid motor but serves also to connect the other side of the member 20 to which water is applied under pressure in communication with the port 35 to allow water to exhaust. In other words, when water pressure is applied to face 20A, the water opposite the face 20B is squeezed into the port 35 and the outlet opening 21; and, when water under pressure is directed against face 20B, the water opposite face 20A is, in similar manner, ejected out of the opening 35 and outlet opening 21. It is noted that the cross sectional area of the outlet 21 may be varied by adjustment of the screw 30, the screw 40 and channel 21 serving as a needle valve for controlling the speed of the fluid motor 15.

Of importance in the present arrangement is the particular valve member 30, its function with respect to the ports 34, 35 and 36, and the manner in which the valve member 30 is moved by the over-center arrangement, including the novel yoke member 32 and actuating member 31. It is noted that this yoke member 32 is somewhat heart-shaped. This yoke member 32 is moved from the positions shown in Figure 4 to Figure 6 with a snap action after it is moved beyond its dead center position shown in Figure 5. It is noted that the spring 33 not only serves to place the yoke member 32 into engagement with the actuating member but this actuating member is likewise maintained biased against its seat formed in the stationary shaft 47.

It is thus apparent that in the operation of the sprinkler shown in Figure 1, water is diverted from the pipe 11 to operate the fluid motor 15. The valve member 30 successively and in turn, presses one side of the stationary member 20 into communication with the high pressure water in pipe 11 and simultaneously exhausts the other side of the member 20 to atmosphere through port 35. It is further apparent that the valve member 30 is shifted from the position shown in Figure 4 to the position shown in Figure 6 and vice versa at the ends of the strokes of the casing 16. In other words, when casing 16 is moved to its furthermost position in the clockwise direction indicated by the arrow in Figure 2 the valve member 30 is automatically moved to cause the casing 16 to be moved in the opposite direction to the end of its stroke at which time again the valve member 30 is automatically operated to cause the casing 16 to move in the opposite direction and so forth. In the modified arrangement shown in Figure 8, the valve structure is identical to that previously described in connection with Figures 1 through 6 and for that reason need not be described again in detail. The significant difference in the structure shown in Figure 1 and Figure 8 is that the pipe 11 is connected and in communication with the movable hollow shaft 50 of the fluid motor 51 whose casing 52 is mounted stationary with respect to the base 53. Thus, in Figure 8 the casing 52 is stationary and the pipe 11 is oscillated by the pivotally mounted diaphragm 55 of the fluid motor 51. A cover member 56 is disposed on the left hand end of the sprinkler to provide a fluid tight chamber 57 which is normally at substantially the same pressure as is the pressure in pipe 11. The fluid under pressure in chamber 57 is selectively transferred to opposite sides of the movable diaphragm 55 by the valve structure 19 described in greater detail above in connection with Figure 1.

In the arrangement shown in Figures 7, 9 and 10, the diaphragm member 55 is again movable while the casing 52 of the fluid motor is maintained stationary with respect to base 53. Instead of the valve mechanism 19 being on the left hand end of the sprinkler as is the case in Figure 8, the same valve mechanism 19 is interposed between the oscillatable pipe 11 and the fluid motor 51. Thus, in Figure 10, the shaft of the fluid motor need not be hollow as is the case in Figure 8. The stationary cover member 60 through which the oscillatable shaft 61 passes encloses a fluid tight chamber 62 in which the water pressure is substantially the same as that inside pipe 11. Water in chamber 62 may be selectively transferred to opposite sides of the diaphragm 55 at the opposite ends of travel of such diaphragm 55 in accordance with motion of the valve member 30.

It is noted that the division of water flow on the one hand to the ports 12 and on the other hand to the chamber 62 may be controlled by the screw threaded valve member 64 whose conical end cooperates with the conically shaped seat 65 in the coupling member 66 to form a needle valve. This coupling member 66 serves to couple the pipe 11 to the hollow shaft 61 which passes through the fluid tight packing 67 into the chamber 62. In the arrangements shown in Figures 7, 8, 9 and 10 wherein the shaft of the fluid motor is oscillated (instead of the casing as in Figure 1) the valve actuating member 31 is moved directly by the shaft 17. For this purpose, as noted in Figure 7, a shaft 61 is adapted to seat the valve actuating member 31 with permissible relative movement between the shaft and the member 31.

Thus, as is evident from the disclosure in Figure 7 when and as the shaft is rotated a predetermined distance to move the valve actuating member 31 to an over-center position, the spring 33 is effective to move the valve member 30 with a snap action for its intended purpose.

Referring now to Figures 11, 12 and 13, there is shown another structure embodying the present invention. Water under pressure from pipe 11 passes through the hollow coupling member 70 through the opening 71 into the chamber 72 wherein, as shown in Figure 13, there is disposed a novel snap action valve member 74 adapted to selectively place the chamber 72 in communication with opposite sides of the movable diaphragm 75 of the fluid motor 76. The movable diaphragm 75 is mounted on its shaft 76a, one end of which is hollow and communicates with the atmosphere to allow passage of water from the fluid motor to the atmosphere. It is noted that the diaphragm 75 is of hollow wall construction with the hollow shaft 76a in communication therewith. There is also mounted on such diaphragm the check valve member 78 which is pivotally mounted at 79. The valve member 74 is pivotally mounted on the oscillatable shaft 76a and is adapted to close at any particular time the port 77 or the port 78, which are in communication respectively with the channels 79 and 80 leading to opposite sides of the diaphragm member 75. Thus, for example, when port 77 is uncovered, fluid under pressure from chamber 72 flows across port 77, through channel 79, to the left hand side of the diaphragm 75 in Figure 12 to move the pivoted check valve member 78 to its position shown therein wherein the fluid on the other side of the diaphragm 75 may be exhausted upon movement of the diaphragm 75 in the direction indicated by the arrow 82. In such movement, fluid on the right hand side of the diaphragm passes through the open check valve up through the hollow wall diaphragm and out of the hollow shaft 76a to the atmosphere. It is apparent that when the port 78 is uncovered, fluid under pressure passes from the chamber 72 through port 78, through channel 80, to the right hand side of the diaphragm 75 to move the check valve 78 to its other position wherein the left hand side of the diaphragm is in communication with the atmosphere.

In order to assure quick and positive motion of the valve member 74 there is provided an auxiliary valve actuating member 83 which is pivotally mounted on the shaft 76a and which is adapted to be engaged by the arm 84 affixed to such oscillatable shaft 76. This auxiliary valve member 83 is normally piped in an over-center position by the torque spring 86 having one of its ends attached to the stationary valve casing 85 and the other one of its ends attached to the auxiliary valve actuating member 83. Thus, when and as the arm 84 engages and moves the valve actuating member 83 to over-center position the spring 86 is effective to move the member 83 further with a snap action to move the valve actuating member 74 in port sealing position. The provision of the auxiliary valve actuating member 83 thus assures closure of at least one of the ports 77, as the case may be, being moved at any one particular time even though the lever member 84 is being moved.

In the arrangement shown in Figures 14, 15 and 16, water is introduced into the sprinkler through the central stationary pipe 90 having opening 91 therein. Water from such central stationary pipe 90 is directed successively to the jets 92, 93 mounted on and extending from the oscillatable housing 94. A valve supporting member 95 is pivotally mounted at 96 on the housing 94 and carries thereon resilient valve closure members 97, 98 adapted respectively to interrupt the flow of water to the jets 92, 93. The pivotally mounted member 95 is maintained in one of its two valve closing positions by the spring pressed ball on the casing 94 engaging a protuberance 101 on member 95 as shown in Figures 15 and 16.

Referring to Figure 15, water under pressure from the central stationary pipe 90 passes through the opening 91 and out of the jet 93 to cause the jet 92 to raise to the position shown in Figure 16. It is noted that in the movement of pivoted valve member 95 from the position shown in Figure 15 to the position shown in Figure 16, the arcuate reentrant portion 101 engages and slides along the stationary pipe 90 until such reentrant portion is adjacent the opening 91 as indicated in Figure 16. In this latter position, the flow of water through opening 91 is temporarily impeded until substantially full water pressure is exerted on the valve member 95 to cause it to pivot about the shaft 96 against the action of the spring pressed ball 100. Thus, when the jet assumes the position shown in Figure 16, a flow of water to jet 93 is interrupted and simultaneously water begins to flow out of the jet 92 to move it downwardly to the end of its downward stroke wherein the other reentrant portion 104 becomes adjacent the opening 91 to cause the flow of water, in similar manner, to be transferred to the other jet. This action continues and the jets oscillate about the axis of pipe 90.

Referring to the modified structure shown in Figure 17, water under pressure from the central stationary pipe 120 (similar to the pipe 90 in Figure 15) passes through the opening 121 into the housing 122 and out of the jet 123 to cause the elongated arm 124 within which the jet 123 is disposed to move in a clockwise direction in response to the reaction forces produced by the water leaving the jet 123. It is noted that in such clockwise movement of the arm 124, water under pressure in the housing 122 is prevented from leaving the other jet 125 in the arm 126 because the valve member 127 is pressed against the inwardly extending end of the pipe 126 to thereby seal its opening. The valve member 127 having formed thereon the valve seats 127A and 127B is pivotally mounted for oscillatable movement about the pin 128 which has its ends anchored in the ends of the cylindrical housing member 122. This valve member 127 is held in either one of its two positions; namely, with valve seat 127A engaging pipe end 126 or with the valve seat 127B engaging the end of pipe 124 due to the water in housing 122 exerting its pressure on the valve member 127. For this purpose, the opening 121 in pipe 120 is in predetermined fixed relationship to the valve member 127 so that water emerging from such opening 121 directly contacts and engages the valve member 127 to firmly press it against the ends of pipe 124 or 126 as the case may be. In order to enhance the resulting force of the valve member 127 and to insure positive action thereof, it is provided with a pair of inwardly disposed curled integrally formed cantilever members 127C and 127D. When, as shown in Figure 17, the cantilever member 127C is moved adjacent the stationary opening 121, the valve member 127, pivotally mounted on its stationary pin 128, prevents the flow of water out of the jet 125 while allowing water out of the jet 123 to cause the pipe 127 to rotate in the clockwise direction. Such clockwise movement of pipe 124 continues until the other cantilever member 127D is moved adjacent the stationary opening 121 in which case the water pressure exerted on the cantilever member 127D causes the valve member 127 to move about its pivot pin 128 and to cause the valve seat 127B to close the opening to pipe 124 to thereby prevent further flow out of the opening 123. Simultaneously, water is then allowed to flow through the pipe 126 and out of the jet 125 to cause movement of the pipes 124 and 126 in the counterclockwise or reverse direction. It is thus apparent that an oscillatory movement is imparted to the pipes 124 and 126 and that they are automatically reversed in direction at the end of their counterclockwise and clockwise strokes. Thus, the movement of the pipes 124 and 126 is substantially the same as the movement of the corresponding jets 92 and 93 in the related modifications shown in Figures 15 and 16.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A sprinkler comprising a base member; a conduit cradled in said base and having a water inlet opening at one end thereof; said conduit having a plurality of sprinkling jets extending therefrom; a water motor in communication with the other end of said conduit whereby the full pressure of water entering said water inlet is effective to force water through said jets; said water motor including a pivotally mounted diaphragm and a casing; said diaphragm being locked to said base and said casing being coupled to the other end of said conduit to oscillate said conduit.

2. In a sprinkler of the character described, a base, a generally horizontally extending conduit pivotally mounted on said base, one end of said conduit forming a water inlet for all water flowing to the sprinkler, a water motor mounted on the other end of said conduit, at least one jet extending generally radially from said conduit and in communication with an intermediate portion of said conduit whereby the full pressure of the water supply to the sprinkler is effective to cause the flow of water through said jet, said water motor comprising a diaphragm and a casing, said diaphragm being affixed to said base and said casing being affixed to said other end of said conduit, a plurality of ports in the wall of said casing controlling the ingress and egress of water to and from opposite sides of said diaphragm, a cooperating valve member movably mounted with respect to said ports, a pivoted actuating member for said valve member, an overcenter mechanism including said valve actuating member whereby said valve member may be moved from one extreme position to another extreme position with a snap action.

3. The arrangement set forth in claim 2 in which said overcenter mechanism includes a generally heart shaped yoke member encircling said actuating member and with the apex of said heart shaped yoke member biased into engagement with said actuating member by a coil tension spring having one of its ends attached to said yoke member and the other one of its ends attached to said casing.

NORRIS NORDENSTAM.

REFERENCES CITED

The following references are of record in the file of this patent:

UNITED STATES PATENTS

| Number | Name | Date |
|---|---|---|
| 1,085,609 | Heath | Feb. 3, 1914 |
| 1,517,664 | Berquist | Dec. 2, 1924 |
| 1,696,385 | Coles | Dec. 25, 1928 |
| 1,755,455 | Nelson | Apr. 22, 1930 |
| 2,124,797 | Rust et al. | July 26, 1938 |
| 2,266,573 | Stone | Dec. 16, 1941 |
| 2,358,377 | Bilde | Sept. 19, 1944 |

FOREIGN PATENTS

| Number | Country | Date |
|---|---|---|
| 578,351 | Germany | June 12, 1933 |